(12) United States Patent
Behravesh et al.

(10) Patent No.: US 7,615,280 B2
(45) Date of Patent: Nov. 10, 2009

(54) METHOD AND APPARATUS TO DETECT A STARTING EDGE OF A ROLL OF MATERIAL

(76) Inventors: Arash Behravesh, 10606 Winfield Loop, Manassas, VA (US) 20109; Esfandiar Behravesh, 8055 Cambridge #41, Houston, TX (US) 77054

( * ) Notice: Subject to any disclaimer, the term of this patent is extended or adjusted under 35 U.S.C. 154(b) by 86 days.

(21) Appl. No.: 10/866,910

(22) Filed: Jun. 14, 2004

(65) Prior Publication Data

US 2005/0275828 A1  Dec. 15, 2005

(51) Int. Cl.
  *B32B 5/16* (2006.01)
  *B32B 33/00* (2006.01)
(52) U.S. Cl. .......... 428/323; 428/67; 428/343; 562/551; 562/555; 562/577
(58) Field of Classification Search ............... None
  See application file for complete search history.

(56) References Cited

U.S. PATENT DOCUMENTS

| | | | |
|---|---|---|---|
| 3,364,056 A | 1/1968 | Seibel | 117/46 |
| 3,575,882 A | 4/1971 | Vandegaer et al. | 252/316 |
| 3,577,515 A | 5/1971 | Vandegaer | 424/32 |
| 3,607,776 A | 9/1971 | Santo et al. | 252/316 |
| 4,349,599 A | 9/1982 | Adams | 428/233 |
| 4,412,959 A | 11/1983 | Wegner et al. | 264/4.1 |
| 4,419,175 A | 12/1983 | Bradshaw et al. | 156/554 |
| 4,447,485 A | 5/1984 | Aritake | 428/144 |
| 4,725,454 A | 2/1988 | Galli et al. | 427/208 |
| 4,855,170 A | 8/1989 | Darvell et al. | 428/40 |
| 5,054,872 A | 10/1991 | Fan et al. | 385/130 |
| 5,340,629 A | 8/1994 | Rodighiero | |
| 5,795,835 A | 8/1998 | Deeb et al. | 442/62 |
| 5,849,052 A | 12/1998 | Barber, Jr. | 51/298 |
| 5,913,245 A * | 6/1999 | Grossman | 73/800 |
| 6,048,806 A | 4/2000 | Deeb et al. | 442/151 |
| 6,623,825 B2 | 9/2003 | Wong | 428/41.3 |
| 6,628,885 B1 | 9/2003 | Wilkie et al. | 385/147 |
| 6,767,628 B1 * | 7/2004 | Posa et al. | 428/343 |

* cited by examiner

*Primary Examiner*—Monique R Jackson

(57) ABSTRACT

A method and product to detect a starting edge of a roll of material are described. The roll of material includes a composition, an apparatus, or a combination thereof, which provides the detectable edge.

18 Claims, 4 Drawing Sheets

METHOD AND APPARATUS TO DETECT A STARTING EDGE OF A ROLL OF MATERIAL

BACKGROUND OF THE INVENTION

The present invention relates to a roll of material having a detectable starting edge. Particularly, the present invention relates to a method and apparatus for detecting a starting edge of a roll of material. More particularly, the present invention relates to a method and apparatus for detecting a starting edge of a roll of tape.

A roll of adhesive tape is often prepared by applying an adhesive composition to a backing and then winding the backing on a cylindrical core to form the roll of tape. The starting edge face of the roll of tape is often difficult to detect and/or detach from the backing.

The starting edge of an adhesive tape, generally, attaches to the backing of the adhesive tape, which makes it difficult to find the starting edge. Detaching the starting edge of an adhesive tape is especially difficult when the roll of tape is used in environments that are not well illuminated or when the roll of tape is used by a user wearing gloves or by a user having limited dexterity.

A number of methods have been developed for facilitating locating the starting edge of a roll of tape. For example, the roll of tape may be placed in a tape dispenser. However, tape dispensers are bulky, costly, and unusable in certain environments.

Accordingly, a need exists to facilitate locating the starting edge of a roll of tape under a variety of environments.

SUMMARY OF THE PRESENT INVENTION

It is therefore a feature of the present invention to provide a roll of material having a detectable edge.

Another feature of the present invention is to provide a roll of material having a composition, an apparatus, or a combination thereof, which provides a detectable edge.

A further feature of the present invention is to provide a roll of material composition having a starting edge that includes color changing characteristics, detackifying characteristics, or combinations thereof when in contact with air and/or moisture.

A further feature of the present invention is to provide a roll of material having a detectable edge that is illuminated.

A further feature of the present invention is to provide a detectable edge apparatus including a light emitter, at least one fiber optic in communication with the light emitter, and at least one power source in communication with the light emitter.

A further feature of the present invention is to provide a system, including an apparatus, a composition, or a combination thereof, that allows a user of a roll of material to detect an end or a starting edge of the roll of material.

A further feature of the present invention is to provide a system that affords an optical reflection that can be detected under a plurality of conditions.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a method to provide a detectable edge on a roll of material. The method includes introducing a composition which includes color changing characteristics, detackifying characteristics, or a combination thereof when in contact with air and/or moisture.

The present invention also relates to a method of making a roll of material having a detectable starting edge by incorporating a fiber optic system in the roll of material.

The present invention further relates to a method of making a roll of material having a detectable starting edge by introducing a composition which includes color changing characteristics, detackifying characteristics, a fiber optic system, or a combination thereof in the roll of material.

It is to be understood that both the foregoing general description and the following detailed description are exemplary and explanatory only and are intended to provide a further explanation of the present invention, as claimed.

The accompanying drawings, which are incorporated in and constitute a part of this application, illustrate various aspects of the present invention and, together with the description, serve to explain the principles of the present invention.

DETAILED DESCRIPTION OF THE PRESENT INVENTION

Figure 1:
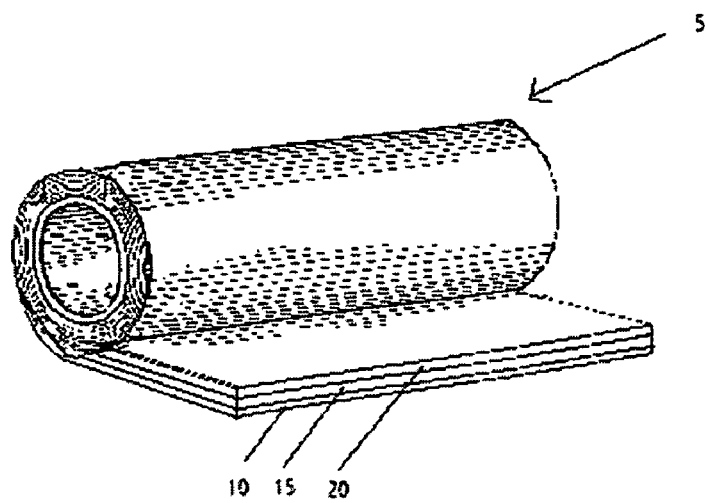
FIG. 1 is diagram of an example arrangement having a backing layer, a second layer, and an adhesive layer.

Although the following description describes a roll of tape, the following description, in general, applies to all materials having adhesive characteristics.

In general, the present invention relates to a roll of material, wherein the material includes a detectable edge. In one example, the roll of material is a roll of tape. In more detail, the roll of material of the present invention includes a composition and/or an apparatus, which provides the detectable edge of the roll of material. In one example, the detectable edge is the starting edge of the roll of material. In the present invention when a section of the rolled material is cut, the new starting edge of the rolled material can include a color that is different from the body of the rolled material, can be at least partially detackified from the body or the rolled material, or can be, at least partially, illuminated to make the new staring edge easily detectable.

In the present invention, the reference to a starting edge of a rolled material relates to any starting edge of a rolled material. For instance, the starting edge in the present invention relates to the starting edge of an adhesive tape and any subsequent starting edges created when a part of the adhesive tape is cut from the roll of the adhesive tape.

In one example, the edge of a roll of material, such as the starting edge of a roll of an adhesive tape, can be made detectable by incorporating, for example, a composition that can change the color of and/or detackify, at least a portion of the starting edge of the roll of material, when the composition is in contact with air and/or moisture, and/or by incorporating an ink and/or detackifying agent in a capsule in the roll of material.

An exemplary composition that can be added to the roll of material, which can change the color of and/or detackify at least part of the roll of material, such as, at least a portion of the starting edge of the roll of material can include, for example, at least an ink and/or detackifying agent in a capsule, a getter material, an ionic composition, a hydro-degradable composition, at least one sphere, when the composition is in contact with air and/or moisture, or a combination thereof.

A getter material, for the purposes of the present invention, can be any material that can react with oxygen, moisture in the air, or one or more elements or compositions that make up the atmosphere in which the roll of material is to be used. When the getter material reacts with air and/or moisture, the getter material can change color or provide detackifying characteristics. For instance, when the getter material is an oxygen getter material, it can be any material selected from the Periodic Table of Elements. The oxygen getter material can change color and/or detackify at least a portion of the starting edge of a roll of tape, when it adsorbs the oxygen in the air or any other components that make up the atmosphere in which the tape is being used. In one example, the oxygen getter material includes cobalt, magnesium, calcium, sodium, aluminum, carbon, titanium, or zirconium. When the getter material is a moisture getter material, it can be any material selected from the Periodic Table of Elements. The moisture getter material can change color and/or detackify, when it adsorbs the moisture in the air. In one example, the moisture getter material includes magnesium, calcium, sodium, aluminum, carbon, titanium, zirconium, or polymers which are hydrolyable such as polyanhydrides, poly(alpha hydroxy esters), and poly(phosphazenes). In another example, the getter material is capable of adsorbing both oxygen and moisture and it is capable of changing the color of and/or detackify at least a portion of the starting edge of the roll of material, when it comes in contact with air and/or moisture.

In one embodiment in which the composition includes an ionic or an ionizable composition, the ionic of the ionizable composition can include a hygroscopic composition. For instance, a hygroscopic composition of the present invention can be a salt. The salt can include color changing characteristics, detackifying characteristics, or a combination thereof, when the salt is in contact with air and/or moisture or when the salt is in contact with one or more elements or compositions that makeup the atmosphere in which the tape is to be used. The hygroscopic composition can include a metal containing salt. An example of the metal containing salt can be the salt form of transitional metals of the Periodic Table of Elements, and/or can be salts of Group VIII of the Periodic Table of the Elements. For example, the hygroscopic composition can include a cobalt salt, such as $CoSO_4$. Other exemplary salts that can be used in the present invention include, but are not limited to, $FeSO_4$. The above-mentioned salts are commercially available.

The ionic or ionizable composition can be a hydrophilic compound, such that it can absorb or attract the moisture in the air thereby acting as a detackifying agent. An exemplary hydrophilic compound that can be utilized in the present invention can conclude, among other things, carbohydrates and complex proteins.

Generally, ionic compounds are hygroscopic because they form stable hydrates. Metal cations (M), (being positively charged) attract the lone pairs on the water oxygen and form coordinate covalent bonds with water. For example, many divalent cations $M^{2+}$ can form ions like $[M(H2O)_6]^{2+}$. One or more of the water molecules can be replaced with anions in the hydrate.

Cobalt(II) salts, such as $CoCl_2$ and $CoSO_4$, are deep blue in an anhydrous state. When exposed to water/moisture in any form, such as the humidity in the air, these salts dissociate and form complex ions, such as $[Co(H2O)_6]^{2+}$, in which the cobalt(II) ion is bonded to six water molecules in an octahedral arrangement. The end result of the association of the hygroscopic salt with water is a color change from deep blue to pink. An example of the resulting equilibrium for $CoCl_2$ may be written as follows: $CoCl_2 + 4H_2O \leftrightarrow [CoCl_2(H2O)_4]^{2+}$.

In one embodiment of the present invention, a second hygroscopic composition can be added to the primary hygroscopic composition. In one example, the second hygroscopic composition may or may not have a color changing ability. In another example, the second hygroscopic composition may not include a color changing ability. Although in the exemplary embodiment in which the second hygroscopic composition may not have a color changing ability, the second hygroscopic composition can be made of material having a predetermined absorption rate. The hygroscopic compositions can be selected based on their color changeability and their water absorption rate. For instance, if the first hygroscopic composition includes a high water absorption, wherein the composition is capable of changing color from blue to pink, a second hygroscopic composition can be added that includes a slower water absorption rate. Therefore, the combination of the two hygroscopic compositions provide a better control over the water absorption rate, color changing rate, and/or the length/position of the detackified portion of the adhesive tape. In summary, the addition of the second hygroscopic composition can result in a better control of the color change as the addition of the second hygroscopic composition provides a better control over water absorption.

In another embodiment, the composition includes a hydro-degradable composition. The hydro-degradable composition of the present invention may include an ester, an anhydride, an amide, or a combination thereof. Preferably, the ester, anhydride, amide, or a combination thereof bonds to the polymer backbone—bonds that can be hydrolyzed in an aqueous environment. For instance, an exemplary bond that can be hydrolyzed in an aqueous environment can be illustrated as shown below:

color and/or detackifies, at least part of, the new starting edge; thereby, creating a detectable edge.

In one exemplary embodiment, ink and/or detackifying capsules can be present throughout the rolled material in addition to or instead of the color changing and/or detackifying agent. Any known ink and/or detackifying agent can be used in the capsules. Exemplary processes for producing the capsules are described in U.S. Pat. Nos. 3,575,882; 3,577,515; 3,607,776; and 4,412,959, which are incorporated in their entirety by reference herein. Preferably, the capsules are micro-sized capsules, nano-sized capsules, or a combination thereof containing a predetermined amount of ink and/or detackifying agent. In this embodiment of the present inven-

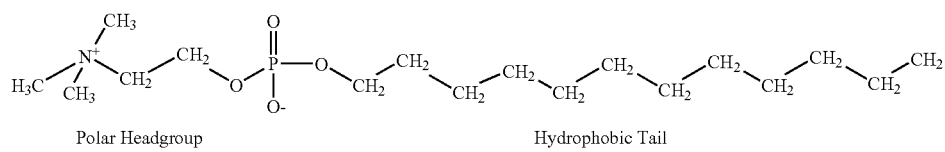

Polar Headgroup            Hydrophobic Tail

Hydro-degradable materials can be incorporated into the tape formulation to act as detackifying agents. The rate of degradation can be controlled by the length of the hydrophobic tail and the ability of the polar head group to act as a hygroscopic material. Amphiphilic polymers can self orient into spheres of micro- and nano-size.

In an embodiment in which the composition includes at least one a sphere, the sphere can be a micro-sized sphere, a nano-sized sphere, or a combination thereof. The sphere can include at least one coloring compound encased and/or encapsulated in a polymer. The polymer can be a lipophilic polymer. In this embodiment, the composition can include an adhesive composition.

In an example, the coloring compound is a dye, and the dye can be a hydrophilic dye.

Figure 6A:
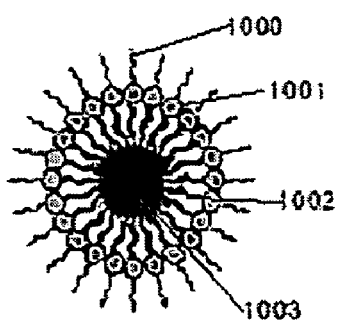
FIGS. 6(*a*) and (*b*) illustrate the chemical composition of a microsphere incorporated in a roll of material.
Figure 6B:
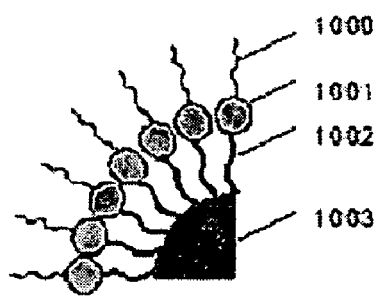

The lipophilic polymer of the present invention can include three sections. The outer section or part/portion can be a hydrophilic degradable polymer. The second section or part/portion can be a hydrophobic polymer, and the third section or part/portion can be a hydrophilic composition. An exemplary sphere of an embodiment of the present invention is illustrated in FIGS. 6(a) and 6(b) in which the degradable hydrophilic polymer 1000 can be attached or be in contact with the hydrophobic polymer 1001. The hydrophobic polymer 1001 can then be in contact with the hydrophilic composition 1002 which encapsulates the hydrophilic dye 1003.

In the embodiment in which a color changing composition and/or a detackifying agent that can react with air and/or moisture is used, the starting edge of the rolled tape having the color changing composition and/or detackifying agent is, preferably, in contact with air and/or moisture. The oxygen and/or the moisture in the air can react with the color changing composition and/or detackifying agent at the starting edge of the rolled tape to change the color of and/or to detackify, at least a portion of, the starting edge of the rolled tape. When a user removes at least a portion of the rolled tape, the user creates a new starting edge. Given that the color changing material and/or detackifying agent is present throughout the rolled tape, when the new starting edge is created, the color changing composition and/or detackifying agent, again come in contact with air. The reaction of the color changing composition and/or detackifying agent with air, again changes the tion, the action of cutting a portion of the rolled material causes the ink and/or detackifying capsules to rupture; thereby, releasing the ink and/or the detackifying agent. The release of the ink and/or the detackifying agents can cause the starting edge of the rolled material to have a different color than the remaining body of the tape and/or to detackify, at least a portion f the starting edge; thereby, making the starting edge of the rolled material easy to detect.

In another exemplary embodiment of the present invention in which the roll of material includes a detectable edge, the roll of material can include an apparatus or a system that enables a person using the roll of material to detect the starting edge of the roll of material. The apparatus or the system of the present invention can be incorporated into the roll of material by itself or in combination with the composition described above that is capable of changing the color of and/or detackifying at least a portion of the starting edge of the roll of material.

An exemplary apparatus of an embodiment of the present invention can include an apparatus/system that is capable of lighting/illuminating the starting edge of a rolled material. For instance, the apparatus can include a light emitter, at least one fiber optic in communication with the light emitter, and at least one power source in communication with the light emitter.

In one system of an embodiment of the present invention, the system can include an apparatus, a composition, or a combination thereof that allows a user of a rolled material to detect an end/(starting edge) of the roll of material. In one embodiment, the apparatus of the system can include at least one fiber optic having a first end and a second end, in which at least one of the first end or second end can be in communication with at least one light emitter, and wherein the light emitter can be in communication with at least one power source.

The system of the present invention can be designed so that it can provide an optical reflection that can be detected under a plurality of conditions. The system of an embodiment of the present invention can provide a concentrated high magnitude optical reflection at the starting edge of the roll of material.

Any number of sizes of fiber optic can be used in an embodiment of the present invention. Preferably, the fiber optic includes a radius that can easily break, tear, or cut when a portion of the roll of material is torn or cut away. The fiber optic can include, for example, a diameter of from about 1 micron or less to about 0.5 inches or more. For example, the fiber optic can include a diameter of from about 2 microns to about 0.25 inches in diameter.

Additionally, the fiber optic can include a length that is greater than, equal to, or less than the total length of the rolled material. For instance, if the fiber optic includes a serpentine disposition, the length of the fiber optic can be greater than the total length of the rolled material.

One end of the fiber optic can be in communication with the light emitter, wherein the light emitter can be a light emitting diode (LED). The light emitter, in turn, can be controlled by a control unit.

The entire system can be controlled by a power source, for example, a battery.

In one embodiment, the apparatus also can include an activating switch to provide power or disconnect power to the light emitter.

The system of the present invention, in addition or in the alternative, can include a composition that includes color changing characteristics, detackifying characteristics, and/or ink/detackifying capsules.

In one embodiment of the present invention, the composition of the present invention can include the same chemicals described above, which can include color changing and/or detackifying characteristics, when they come in contact with air and/or moisture.

The roll of material of an embodiment of the present invention can include a first layer or a backing layer, and a second layer. In one example, the first layer can include a material that is, at least partially, gas impermeable and/or moisture impermeable. In another example, the first layer can include a material that is moisture impermeable. The second layer can include ink/detackifying capsules, a composition capable of changing color and/or detackifying, at a least portion of the tape, such as the starting edge of the roll of material, or a combination thereof. In one example, the second layer can further include an adhesive material. The adhesive material, in one example, can be uniformly mixed with ink/detackifying capsules, the material having color changing characteristics, and/or the material having detackifying characteristics.

In another example, the second layer is an adhesive layer and the first layer or the backing layer can include at least one ink/detackifying capsule, a composition capable of changing color and/or detackifying, at a least portion of the tape, such as the starting edge of the roll of material, or a combination thereof.

In another example, the roll of material of the present invention can include a third layer. The third layer can be made from an adhesive material. In one embodiment, the third layer can be made from an adhesive material that can be, at least partially, and/or at least temporarily, gas impermeable, moisture impermeable, or a combination thereof. In an embodiment having a third layer, generally, the second layer can include at least one ink/detackifying capsule, a composition capable of changing the color of and/or detackifying at least portion of the starting edge of a roll of material. The adhesive material can be any kind of adhesive material such as, for instance, pressure sensitive adhesive material, or any other known adhesive material used in the tape industry.

The adhesive tape of an embodiment of the present invention can be made by any method known to one skilled in the art of making a roll of adhesive tape. For instance, one method of making a roll of material having a detectable edge includes introducing the ink/detackifying capsules, the composition that has the color changing characteristics and/or detackifying characteristics to a surface area on the roll of material. The ink/detackifying capsules, the composition which can have color changing characteristics, and/or the detackifying characteristics can be introduced on the surface of the backing layer, wherein the backing layer can be at least partially or temporarily, gas impermeable, moisture impermeable, or a combination thereof.

In one example, the method of detecting an edge of a roll of material can include introducing a second layer, which can include a composition having color changing characteristics and/or detackifying characteristics, when coming in contact with air and/or moisture, onto a first layer. Specifically, this method can include introducing an adhesive composition onto the second layer or mixing an adhesive composition with the ink/detackifying capsules and/or the composition having color changing/detackifying characteristics that constitute the second layer, or a combination thereof.

The method of making a roll of tape is described in U.S. Pat. Nos. 3,364,056; 4,349,599; 4,447,485; and 4,725,454, each of which is incorporated in its entirety herein by reference. The ink/detackifying capsules, the color changing composition, and/or the detackifying agent of the present application can simply be mixed into the adhesive layer of the above patents or can be incorporated onto the backing layer as a separate layer. In the embodiment in which the ink/detackifying capsules, the color changing composition, and/or the detackifying agent is added as a separate layer. This layer can be placed between the backing layer and the adhesive layer.

In another example, the method of an embodiment of the present invention can incorporate a system/device to the roll of material in which the method of making the system/device can include introducing a light emitter to the roll of material, introducing at least one fiber optic which can be in communication with the light emitter, and introducing at least one power source which can be in communication with the light emitter. The fiber optic of the present invention can be incorporated into the material that composes the rolled material. For example, the fiber optic can be a part of or can be woven into the first layer or the backing layer of the material. In this example, the fiber optics form at least part/portion of the material making the first layer or the backing layer. In the exemplary embodiment in which the fiber optic is woven in the first layer or the backing layer, the fiber optic can be woven in the first layer or the backing layer, for example, by the method described in U.S. Pat. No. 6,628,885, which is incorporated in its entirety by reference, herein. In yet another exemplary embodiment, at least one fiber optic can be introduced on a surface of the roll of material.

In an exemplary embodiment in which the fiber optic can be placed on the surface of the roll of material, once the desired length of the roll of material is cut, the fiber optic, if desired, can be peeled away from the cut portion of the roll of material.

As stated above, the light emitter can be in communication with the fiber optic. Upon activation by the control unit and drawing upon the power source, the light emitter can transmit light into the fiber optic. As the light travels through the length of the fiber optic, the light will reach the end of the fiber optic. Each ending in the length of fiber optic can be designed to provide a concentrated, high magnitude optical reflection and a blinking effect at the end location in the length of each fiber optic. The fiber optic endings can cause the reflection of light to the exterior of the fiber optic at the end of the fiber optic. When light reaches the end of the fiber optic, the light can be reflected to the exterior of the fiber optic.

In one example of the method of the present invention, one end of the fiber optic can be attached to a single light emitter.

In the embodiment, in which the diode is in communication with one end of the length of fiber optic, a light can be simultaneously transmitted in the length of the fiber optic.

In an embodiment in which the light can blink, the blinking effect itself can be generated by causing the recurrent or periodic transmission of light from the light emitter into the length of the fiber optic. The light emitter can be connected to any regulating means having a blinking control unit and a power source. The blinking control unit can be any integrated circuit or any mechanism appropriate for causing the recurrent transmission of light by the light emitter and which is powered by any appropriate power supply that can be portable, such as a battery cell or its equivalent. The regulating means can be connected directly to the light emitter.

The entire system can be activated by any "on-off" mechanism in that communicates with the regulating means. When the switch is in the "on" position, power can be recurrently available to the light emitter through the control unit, which may include a blinking controller that can control when the light is transmitted. This can result in the periodic or recurrent transmission of light from the light emitter into the fiber optic length. By setting up the regulating means in an appropriate fashion, light can be transmitted more or less frequently as the electrical flow to the light emitter is regulated. Thus, a more or less frequent blinking effect can be seen at each incision location. If only a constant reflection at the starting edge of the rolled material is sought, rather than a blinking effect, then a continuous transmission of light into the length of fiber optic can be used.

In one instance, at least one adhesive composition can be introduced to connect the fiber optic to the backing layer of the roll of material. In another instance, an adhesive composition is added to the roll of material and the fiber optic so that the adhesive material encapsulates the fiber optic placed on the backing layer. In this instance, the adhesive composition can act not only to connect the fiber optic to the backing layer, but it can also act as the adhesive layer of a roll of tape. In this example, the adhesive encapsulating the fiber optic can be an adhesive layer that can be applied to the backing layer and the fiber optic.

In an example in which the method includes incorporating a light emitter system into the roll of material, the system can include a light emitter, at least one power source, and a power switch, wherein the light emitter can be in communication with at least one fiber optic. The light emitter, at least one power source, and the optional power switch can constitute a single system. This system can be located and/or connected to a part of a tube or cylindrical core upon which the material is rolled. In one example, the rolled material can be rolled on the top of the rolling tube or cylindrical core and the system containing the light emitter, at least one power source, and the optional power switch can be located within the tube. The tube or cylindrical core can be designed so that the fiber optic can be in communication with the system while at the same time being part of the rolled material.

In another embodiment, the method of making the present invention can include incorporating the ink/detackifying capsules, the composition capable of changing color, and/or detackifying at least a portion of the starting edge of a roll of material, by the method described above to the roll of material that can have at least one fiber optic, at least one light emitter, at least one power source, and optionally at least one power switch.

Figure 2:
FIG. 2 is a partial diagram of an example embodiment of an adhesive tape in which the second layer includes a color changing composition.
Figure 3:
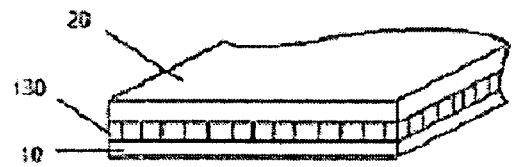
FIG. 3 is a partial diagram of an example embodiment of an adhesive tape in which the second layer includes a detackifying composition.
Figure 4:
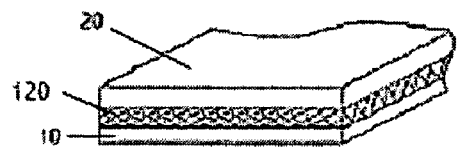
FIG. 4 is a partial diagram of an example embodiment of an adhesive tape in which the second layer includes a color changing composition and a detackifying composition.
Figure 5:
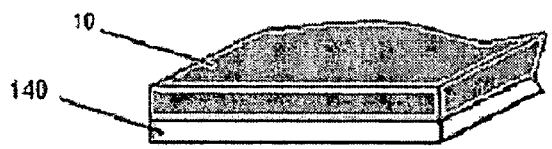
FIG. 5 is a partial diagram of an adhesive tape in which the detackifying composition, color changing composition, or a combination thereof is mixed with an adhesive composition to form a layer.

FIG. 1 illustrates an embodiment of the present invention in which a roll of adhesive tape 5 includes a backing layer (first layer) 10, a color changing composition (second layer) 15, and an adhesive layer (third layer) 20. FIG. 2 is a partial diagram of an adhesive tape, in which the tape includes the backing layer 10, a second layer on top of the backing layer, which includes a color changing composition 100, and an adhesive layer 20 on which top of the color changing composition 100. FIG. 3 is a partial diagram of an adhesive tape in which the second layer includes a detackifying agent/composition 130, instead of the color changing composition 100, as illustrated in FIG. 2. FIG. 4 is similar to FIG. 3; however, the second layer of the adhesive tape in FIG. 4 includes a color changing composition and a detackifying composition, or the color changing composition also includes detackifying characteristics. FIG. 5 illustrates that only 2 layers, namely a backing layer 10 and an adhesive/color changing composition layer 140 are located on top of the backing layer 10.

FIGS. 6(a) and 6(b) illustrate an embodiment of the present invention that incorporates microspheres. The microspheres, according to FIGS. 6(a) and 6(b), include a degradable hydrophilic polymer 1000, a hydrophobic polymer 1001, a hydrophilic polymer 1002, and a hydrophilic dye 1003. The microspheres can be uniformly distributed throughout the adhesive layer or they can be a separate layer that is located between the backing layer and the adhesive layer.

Figure 7:
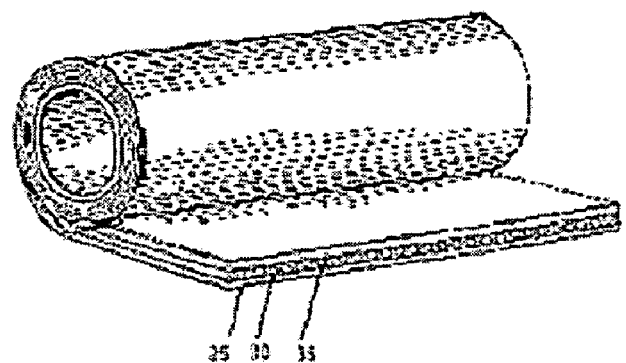
FIG. 7 is diagram of a roll of tape having a backing layer, a plurality of fiber optics, making a second layer, and an adhesive layer.
Figure 8:
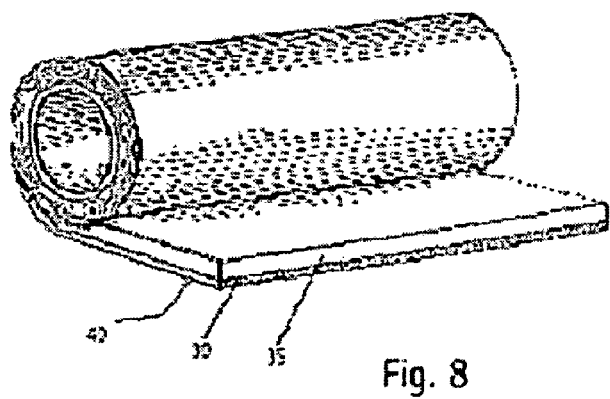
FIG. 8 is diagram of a roll of tape having a backing layer and at least on fiber optic embedded in an adhesive layer.
Figures 9, 10, 11:
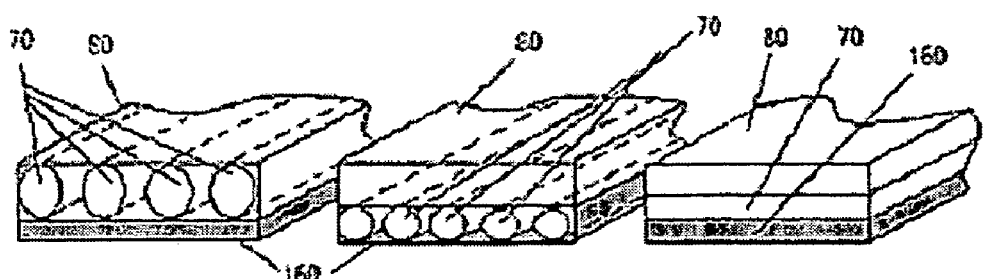
FIG. 9. is a partial diagram of an adhesive tape, illustrating an embodiment having a plurality of fiber optics embedded within the backing layer.
FIG. 10 is a partial diagram of an adhesive tape, illustrating an embodiment having a plurality of fiber optics embedded within the adhesive layer.
FIG. 11 is a partial diagram of an adhesive tape, illustrating an embodiment in which a single fiber optic makes the secondary layer.
Figure 12:
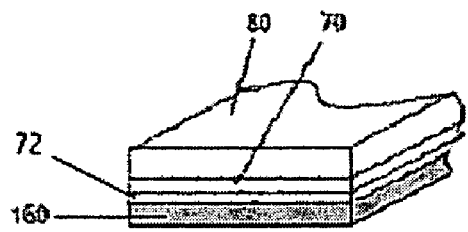
FIG. 12 is a partial diagram of an adhesive tape, illustrating an embodiment in which at least one fiber optic layer makes the secondary layer, and additionally a detackifying or a color changing composition provide another layer which is incorporated between the fiber optic layer and the adhesive layer.

FIG. 7 is a diagram of a roll of tape having a backing layer 25, a plurality of fiber optics 30, constituting a second layer, and an adhesive layer 35. In another embodiment, as illustrated in FIG. 8, the fiber optic system of an embodiment of the present invention incorporates the fiber optics 30 in the backing layer 40. The adhesive layer 35 can then be placed on the backing layer 40, which includes the fiber optics 30. FIG. 9 further illustrates an embodiment which incorporates a plurality of fiber optics 70 in a backing layer 80 and further having an adhesive layer 160 on the backing layer 80 with a plurality of fiber optics 70. FIG. 10 illustrates another embodiment of the present invention, in which fiber optics 70 can be incorporated in the adhesive layer 160. The adhesive layer 160 can also include at least one color changing composition and/or detackifying agent. Furthermore, FIG. 11 illustrates another embodiment of the present invention in which a fiber optic 70 forms a layer and can be located between the backing layer 80 and the adhesive layer 160. In the embodiment illustrated in FIG. 11 of the present invention, the fiber optic 70 layer can be a single fiber optic that constitutes a single layer. An exemplary method of making a fiber optic sheet is illustrated in U.S. Pat. No. 5,054,872, which is incorporated in its entirety by reference herein. One optional method to attach the fiber optic sheet to the backing layer would be to laminate the backing layer with the fiber optic layer before the adhesive layer is applied, while the adhesive layer is being applied to the fiber optic sheet, or after the adhesive layer has already been applied to the fiber optic sheet. An exemplary laminator is described in U.S. Pat. No. 4,419,175, which is incorporated in its entirety by reference herein. FIG. 12 illustrates yet another embodiment of the present invention in which an additional detackifying layer 72 is incorporated between the fiber optic layer 70 and the adhesive layer 160. In FIG. 12, the adhesive layer additionally can include a color changing composition.

Figure 13:
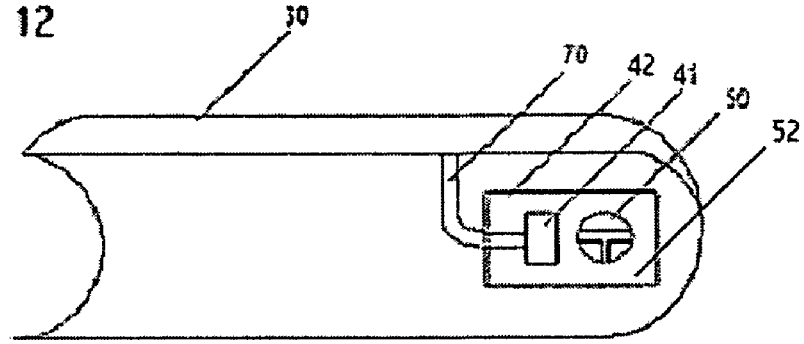
FIG. 13 illustrates the light source and the power source of the fiber optic embodiment of the present invention.

FIG. 13 illustrates an exemplary embodiment of the present invention in which the light source 41 is in communication with the power source 50 via circuitry 52. Furthermore, the light source 41 is in communication with the fiber optic 70. According to FIG. 13, the light source 41, the circuitry 52, the power source 50, and at least part of the fiber optic 70 is connected or is in contact with the roll tube/cylindrical core 31. The roll tube/cylindrical core 31 in turn includes the adhesive tape of the present invention.

Figure 14:
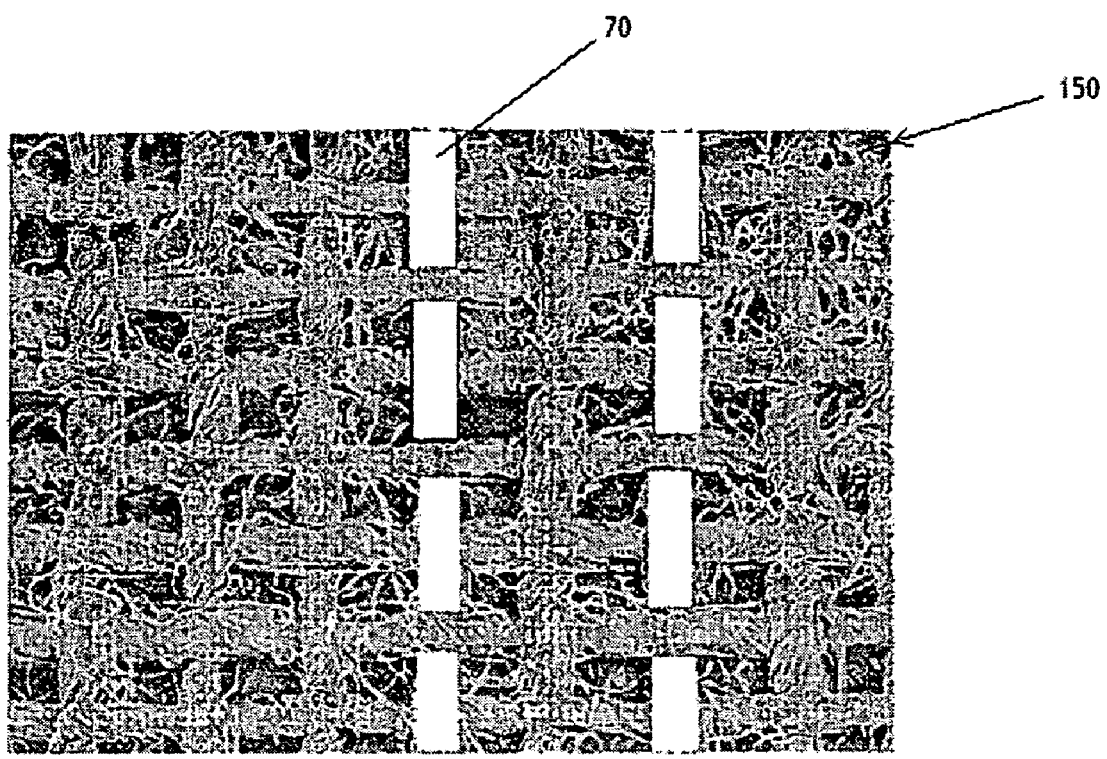
FIG. 14 illustrates an embodiment of the present invention in which at least one fiber optic, at least partially, makes up the backing layer.

FIG. 14 illustrates an embodiment of the present invention in which at least one fiber optic 70, at least partially, includes the backing layer 150.

Other embodiments of the present invention will be apparent to those skilled in the art from consideration of the present specification and practice of the present invention that are disclosed herein. It is intended that the present specification and examples be considered as exemplary only with a true scope and spirit of the invention being indicated by the following claims and equivalents thereof.

What we claim is:

1. A system for detecting a starting edge of a roll of adhesive tape comprising:
    a roll of adhesive tape including a first end and a second end and at least one conduit arranged from about the first end to about the second end of the roll of adhesive tape; and
    a light emitter arranged in communication with an end opposite from the starting edge to be detected,
    wherein the light emitter and the at least one conduit are arranged to provide the starting edge of the roll of adhesive tape with at least one of different color and optical reflection from the rest of the roll of adhesive tape.

2. The system of claim 1, further comprising at least one power source arranged in communication with the light emitter.

3. The system of claim 2, wherein the light emitter produces an optical reflection detectable at the second end of the conduit.

4. The system of claim 3, wherein the optical reflection is a concentrated, high magnitude optical reflection.

5. The system of claim 2, further comprising an activating switch arranged in communication with the at least one power source and the at least one light emitter.

6. The system of claim 1, wherein the roll of adhesive tape includes a first coloration, and further comprising:
    a substance, composition, particle, or a combination thereof incorporated in the roll of adhesive tape, which provides the starting edge of the roll of adhesive tape with (i) a second coloration different from the first coloration, (ii) a detackifying characteristic, or (iii) a combination of (i) and (ii), thereby assisting the user of the roll of adhesive tape in detecting the starting edge of the roll of adhesive tape,
    wherein the substance, composition, particle, or a combination thereof comprises at least one of a getter, ionic, hydro-degradable, and photon particle, material, substance, and composition.

7. The system of claim 6, wherein the substance, composition, particle, or a combination thereof provides (i) the second coloration different from the first coloration, (ii) the detackifying characteristic, or (iii) the combination of (i) and (ii), when comes in contact with air, moisture, or combinations thereof.

8. The system of claim 6, wherein the ionic composition is a hygroscopic composition.

9. The system of claim 6, wherein the hydro-degradable composition comprises at least one ester, at least one anhydride, or combinations thereof.

10. The system of claim 6, wherein the substance, composition, particle, or a combination thereof is encased by at least one capsule, micro-sized sphere, nano-sized sphere, or a combination thereof, which release the material, substance, composition, particle, or a combination thereof when the adhesive tape is cut or torn.

11. The system of claim 10, wherein the substance, composition, particle, or a combination thereof comprises a coloring compound.

12. The system of claim 11, wherein the coloring compound is encased in a lipophilic polymer that comprises at least a hydrophilic group, a hydrophobic group, or combinations thereof.

13. The system of claim 10, wherein the at least one micro-sized sphere, nano-sized sphere, or combinations thereof comprises at least one coloring compound encased in a lipophilic polymer.

14. The system of claim 1, wherein the at least one light emitter is a blinkable light emitter.

15. A system for detecting a starting edge of a roll of adhesive tape comprising:
    a roll of adhesive tape including a first end, a second end, and at least one conduit arranged from about the first end to about the second end of the roll of adhesive tape;
    a blinkable light emitter arranged in communication with an end opposite from the starting edge to be detected; and
    a controller arranged to regulate the blinking of the at least one light emitter,
    wherein the blinkable light emitter and the at least one conduit are arranged to provide the starting edge of the roll of adhesive tape with at least one of different color and optical reflection from the rest of the roll of adhesive tape.

16. A system for detecting a starting edge of a roll of adhesive tape comprising:
    a roll of adhesive tape including a first end, a second end, and at least one conduit arranged from about the first end and to about the second end of the roll of adhesive tape;
    a light emitter arranged in communication with an end opposite from the starting edge to be detected; and
    a composition incorporated in the roll of adhesive tape and comprising a color changing characteristic, a detackifying characteristic, or combinations thereof when the composition comes in contact with air, moisture, or combinations thereof,
    wherein at least one of (i) the light emitter and (ii) the composition provides the starting edge of the roll of adhesive tape with at least one of different color, optical reflection, and detacification from the rest of the roll of adhesive tape that allows a user of the roll of adhesive tape to detect the starting edge of the roll of adhesive tape.

17. The system of claim 16, wherein the composition comprises a getter material, a hygroscopic composition, a hydro-degradable composition, or a combination thereof.

18. The system of claim 16, wherein the composition is encased by at least one capsule, micro-sized sphere, nano-sized sphere, or a combination thereof, which releases the composition when the roll of adhesive tape is cut or torn.

* * * * *